United States Patent [19]

Garcia et al.

[11] 4,392,157

[45] Jul. 5, 1983

[54] PATTERN NOISE REDUCTION METHOD AND APPARATUS FOR SOLID STATE IMAGE SENSORS

[75] Inventors: Enrique Garcia, Sandy Hook, Conn.; Peter L. P. Dillon, Pittsford, N.Y.

[73] Assignee: Eastman Kodak Company, Rochester, N.Y.

[21] Appl. No.: 202,400

[22] Filed: Oct. 31, 1980

[51] Int. Cl.³ .......................... H04N 3/14; H04N 5/30
[52] U.S. Cl. ..................................... 358/213; 358/167
[58] Field of Search ................ 358/163, 167, 212, 213

[56] References Cited

U.S. PATENT DOCUMENTS

| | | | |
|---|---|---|---|
| 3,800,078 | 3/1974 | Cochran et al. | 178/7.1 |
| 3,800,079 | 3/1974 | McNeil et al. | 178/7.1 |
| 3,904,818 | 9/1975 | Kovac | 178/7.1 |
| 3,949,162 | 4/1976 | Malueg | 178/7.1 |
| 4,032,975 | 6/1977 | Malueg et al. | 178/7.1 |
| 4,167,754 | 9/1979 | Nagumo et al. | 358/167 |
| 4,167,755 | 9/1979 | Nagumo | 358/213 |
| 4,228,468 | 10/1980 | Nagano et al. | 358/213 X |

Primary Examiner—Robert L. Richardson
Attorney, Agent, or Firm—Thomas H. Close

[57] ABSTRACT

Pattern noise in the output signal produced by an array of solid state light responsive elements is reduced by adjusting the responses of a subset of elements towards an average element response, thereby reducing the standard deviation of the element response distribution. The elements receiving response adjustments have responses in the upper and lower extremes of the element response distribution as determined by measuring the output of the sensor under controlled illumination conditions. A pattern noise reducing circuit includes: (1) means for deriving a set of response adjustment signals representing (a) the locations in the array of a subset of elements having responses in the upper and lower extremes of the element response distribution and (b) amounts of adjustment to the responses of said subset of elements to move said element responses toward an average response, and (2) means for applying to the signals representing the imagewise responses of said subset of elements, adjustments corresponding to said response adjustment signals, to produce imagewise output signals having reduced pattern noise. According to a further feature of the invention, redundancy reducing coding (e.g. run length coding) is employed to code the locations of the adjusted elements in the memory, thereby reducing the required size of the memory.

10 Claims, 11 Drawing Figures

SENSOR ELEMENT RESPONSE

ADJUSTED SENSOR ELEMENT RESPONSE

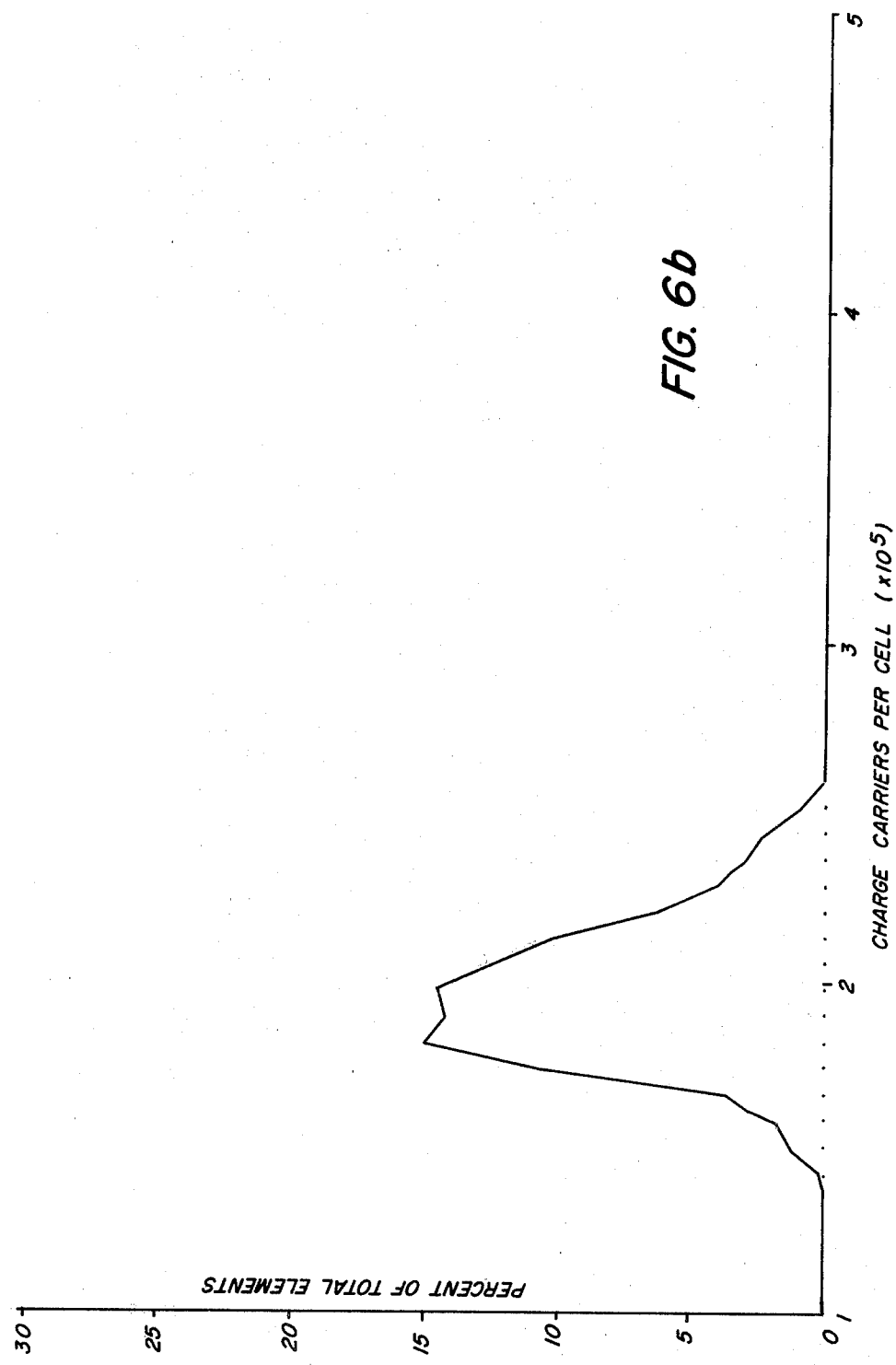

PATTERN NOISE REDUCTION METHOD AND APPARATUS FOR SOLID STATE IMAGE SENSORS

BACKGROUND OF THE INVENTION

1. Field of the Invention

This invention relates to methods and apparatus for reducing pattern noise in the signals produced by a solid state image sensing array.

2. Discussion Related to the Problem

Solid state arrays of light sensitive elements have been proposed for use in various image sensing applications such as the primary image sensors in both television and still picture cameras and in various image analysis roles such as exposure control in photographic cameras and photographic printers. Generally, the signals produced by such arrays of solid state image sensors are subject to two types of disturbances generally referred to as pattern noise. The common feature possessed by these disturbances is that the disturbances are repeatable, and once measured can be removed from the signals. One type of pattern noise is characterized by different fixed amounts of bias in the signal produced by the sensor elements in an array. Dark current is a major contributor to this type of pattern noise which will be referred to hereinafter as "dark current pattern noise." The other general type of pattern noise is characterized by differences in sensitivity among the elements of the sensor array and will be referred to as "sensitivity pattern noise." Sensitivity pattern noise is caused mainly by manufacturing tolerances in the physical dimensions of the sensor elements and by variations in the transparency of electrodes and/or color filters disposed over the elements in the array. Apparent sensitivity variations may also result from non-uniform illumination of a scene that is viewed by the image sensing array. For example, if the scene is a projected image of a transparency, and the projection lamp has "hot spots" in its illumination pattern or the projection optics exhibit vignetting, the resulting effect on the signal produced by the image sensing array will appear as sensitivity pattern noise. Pattern noise is visible in the display of a signal produced by a solid state image sensing array as a pattern of randomly disposed light and/or dark areas superimposed on the image produced by the display.

In the prior art, two general approaches have been taken for correcting or reducing the effects of pattern noise. In the first approach, used most often, for example, in systems with linear image sensing arrays or in very expensive television camera systems, pattern noise is completely removed from the response of every element in the array. U.S. Pat. No. 3,949,162, issued Apr. 6, 1976 to R. M. Malueg, shows such a system for removing dark current pattern noise from the response of a solid state image sensing array. The image sensor is operated in the dark to generate the dark current noise pattern of the sensor. The output of the sensor, thus operated in the dark, is stored in a memory. Later, when the sensor is operated normally to sense an image, the values of dark current stored in the memory are subtracted from the photosignals produced by each element of the array. In this way dark current pattern noise is removed from the signal produced by every sensing element in the array. Similar approaches have been employed for removing sensitivity pattern noise. According to these approaches, the sensor is operated under controlled illumination conditions both in the dark and with non-imagewise illumination and the responses thereto recorded. As used herein, "non-imagewise illumination" means that there is no imagewise modulation of the light, however, there may be constant patterns of brightness superimposed on the illumination resulting in apparent sensitivity variations as described above. The dark responses are subtracted from the light responses to yield pure light responses exhibiting only the sensitivity variations. Percentagewise corrections required to produce a uniform response from all the sensor elements in the array are computed and the required corrections are stored in a memory. Later, during normal operation, dark current corrections are applied to the signals produced by the elements in the array, the dark current corrected signals are then multiplied by factors corresponding to the computed percentagewise corrections to equalize the responses of the elements in the array. For example, see U.S. Pat. No. 3,800,078, issued Mar. 26, 1974 to Cochran et al. and U.S. Pat. No. 4,032,975, issued June 28, 1977 to Malueg et al.

Excellent pattern noise correction is achieved and fine image detail is conserved according to the pattern noise correction methods outlined above. Unfortunately, the cost of the relatively large memories needed to store corrections for each sensor element can be very high, especially for two-dimensional image sensing arrays with large numbers of elements. The memory cost is prohibitive for certain applications such as amateur solid state video still cameras. Although providing excellent correction for the visible noise in the image, the total correction technique also corrects for noise that would have been neither visible nor objectionable in the image reproduced from the sensor signals.

In attempts to reduce the coat, size and complexity of noise correcting circuitry, an alternative approach taken in the prior art has been to detect and record the locations of those sensor elements whose signals are most severely afflicted with pattern noise, and during normal operation, to substitute, for the signals produced by the noisy sensor elements, a signal produced by a neighboring element or the average of a plurality of signals produced by neighboring elements. Both dark current and sensitivity variation pattern noise have been treated in this manner (see U.S. Pat. No. 4,167,755, issued Sept. 11, 1979 to Nagumo). This approach uses relatively simple circuitry and requires a relatively small memory for storing the locations of "bad" sensors. Visibility of the pattern noise in the picture is reduced, however, at the expense of fine image detail. Image detail is sacrificed because some information produced by the sensor, albeit in the presence of noise, is thrown away when a signal from a noisy picture element is replaced by the signal produced by a less noisy neighbor. It has been our experience with experimental image sensors that the instances where the photo information from a sensor element is totally lost or destroyed due to pattern noise are relatively rare exceptions, and in the vast majority of cases, the photosignal from a noisy sensor element is either fully recoverable or recoverable in an attenuated (clipped) form.

The problem we faced, therefore, was to provide a noise reducing circuit for a solid state image sensing array that embodied the advantages of both the prior art approaches, i.e. the ability to preserve image detail while requiring a relatively small memory size and relatively simple circuitry.

SOLUTION TO THE PROBLEM—SUMMARY OF THE INVENTION

According to the present invention, the above-noted problems are solved by adjusting the responses of a subset of sensing elements, in an array of solid state light responsive elements, toward an average element response, to thereby reduce the standard deviation of the response distribution. The responses of the elements in the array are measured under controlled illumination conditions and a response distribution is compiled. The subset of elements is selected from the upper and lower extremes of the response distribution. The adjustments to the responses of this subset of elements to move the element responses toward an average response are computed and the response adjustments are applied during normal operation of the sensor.

A noise reducing circuit according to the present invention includes: (1) means for deriving a set of response adjustment signals representing (a) the locations in the array of a subset of elements having responses in the upper and lower extremes of the element response distribution and (b) adjustments to the responses of said subset of elements to move said element responses toward an average response, and (2) means for applying, to the signals representing the imagewise responses of said subset of elements, adjustments corresponding to said response adjustment signals, to produce imagewise output signals having reduced pattern noise. According to a preferred embodiment of the invention, the noise reducing circuit reduces dark current pattern noise by adding or subtracting predetermined amounts from the signals produced by the subset of elements. To callibrate the noise reducing circuit, the sensor is operated in the dark, and the dark current signal of each element is recorded. A subset of elements having the highest and lowest dark currents is selected and adjustments in the form of additions or subtractions to the signals produced by the subset of elements are calculated. Signals representing the adjustments and element locations are then stored in a memory and later recalled during normal operation of the sensor.

In a further refinement of the invention, after reducing the dark current pattern noise, by adjusting the responses of a first subset of elements by adding and subtracting predetermined amounts to the signals produced thereby, sensitivity pattern noise is reduced by adjusting the response of a second subset of elements by applying percentagewise adjustments to the signals produced thereby. The noise reducing circuit according to this refinement of the invention includes means for effecting both addition-subtraction and percentagewise type adjustments.

An additional feature of the present invention involves the use of redundancy reducing coding, such as run length coding, for coding the element locations and/or response adjustments to reduce the size of the memory required.

BRIEF DESCRIPTION OF THE DRAWINGS

The invention will be described in detail with reference to the drawings, wherein.

DESCRIPTION OF THE PREFERRED EMBODIMENTS

Figure 1A:
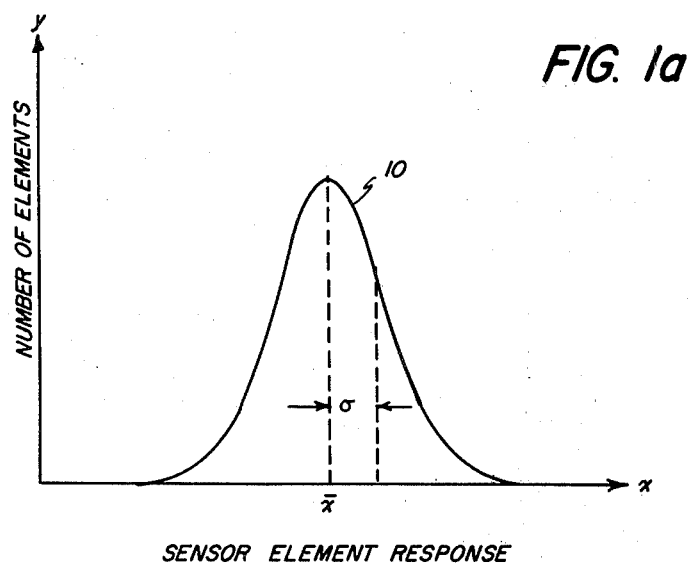
FIG. 1a is an idealized histogram of the unmodified element response distribution, under predetermined illumination conditions, of a solid state image sensing array.

Refer now to FIG. 1a where a curve 10 represents a histogram plot illustrating, qualitatively, the sensor element response distribution under controlled illumination conditions for a solid state image sensing array. The X axis of the histogram represents sensor element response (e.g. the number of charge carriers produced during a fixed interval), and the Y axis represents the number of sensor elements having a response lying within a particular response range. For the purpose of illustration, the distribution is shown as gaussian, having a mean sensor response $\overline{X}$ and a standard deviation $\sigma$. Depending on the intensity of the illumination, the factors contributing to the shape of the histogram will be dark current and/or differences in sensitivity between sensor elements.

The spread of the element response distribution is related to the amount of pattern noise that will be visible, and the standard deviation $\sigma$ of the distribution (as a measure of the spread of the distribution) is a convenient choice for an objective measurement of the amount of visible pattern noise in the signal. It is the essence of the present invention to reduce the spread of the sensor response distribution, thereby reducing the visibility of the pattern noise, by adjusting the responses of a subset of sensor elements toward an average sensor response. In the following examples, the average chosen is the arithmetical mean, however, any element response near the center of the response distribution can be used as the average element response in practicing the present invention.

Figure 1B:
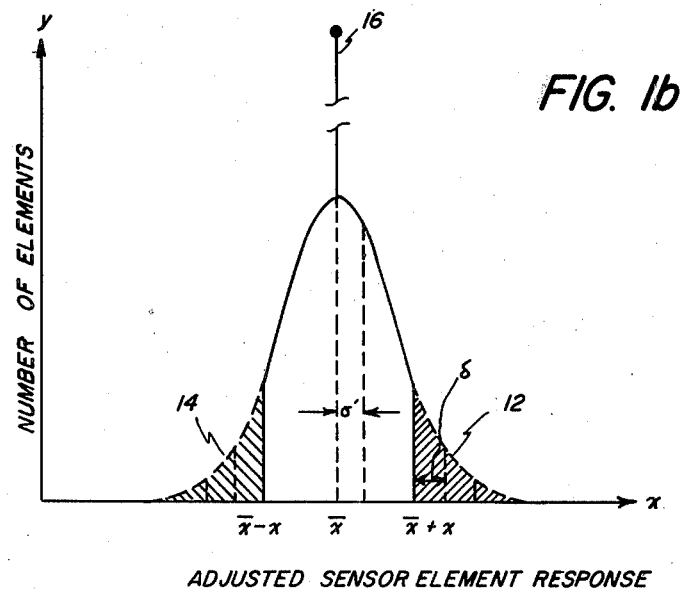
FIG. 1b is an idealized histogram of the element response distribution of FIG. 1a adjusted according to the present invention.

FIG. 1b shows the sensor element response distribution of FIG. 1a after adjustment according to the present invention. Sensor element responses falling above and below a band $\overline{X} \pm x$ have been adjusted toward the means response $\overline{X}$ by an amount equal to the element response deviation. The shaded areas 12 and 14 at the extremes of the distribution represent the previous locations of the corrected element responses and the spike 16 on the top of the distribution at X represents the adjusted element responses. In practice, the amounts of adjustment are quantized. The shaded areas 12 and 14 are divided into bands of width δ and the same adjustment is applied to each element response lying within a given band. The adjustments are chosen to have the effect of shifting the bands to be centered upon X̄. The width δ is at least narrower than the width of the remaining distribution X̄±x. In the process of adjustment, the standard deviation σ of the response distribution is reduced to a new value σ'. The amount of reduction in σ for a given number of adjustments depends in part upon the width δ of the quantization bands. If δ is large, fewer quantization bands are needed to specify all the required adjustments, and therefore the number of bits required to specify each response adjustment is minimized. On the other hand, with wide quantization bands, the average reduction per adjustment in the standard deviation σ will be less. The size of the quantization bands are chosen to optimize the trade-off between noise reduction and storage requirements.

The improvement in sensor performance achievable by means of the present invention can be appreciated by considering the effects of pattern noise on the signal-to-noise ratio of an image sensor. Up to this point we have discussed element response distributions and response adjustments in general without distinguishing betweek dark current pattern noise and sensitivity pattern noise. To illustrate the effects of these two types of pattern noise on the signal-to-noise ratio of a sensor, reference is made to FIG. 2 which is a qualitative graph of signal-to-noise ratio vs. sensor illumination. Considering dark current pattern noise first, it is noted that the amount of dark current is independent of sensor illumination and the photosignal is proportional to sensor illumination. Consequently, the dark current pattern noise will overwhelm the photosignal at very low light levels, causing the signal-to-noise ratio of a sensor to approach zero as the sensor illumination approaches zero. On the other hand, at high illumination levels, the dark current pattern noise will have a diminished effect on the signal-to-noise ratio of the sensor. The signal-to-noise ratio resulting from dark current pattern noise will thus be of the form $I/\sigma_{DC}$ where I is the illumination level and $\sigma_{DC}$ is the standard deviation of the dark response distribution. This is represented by a dotted line 200 in FIG. 2 passing through the origin and having a slope equal to $1/\sigma_{DC}$. The effect of reducing the spread of the dark response distribution according to the present invention is to increase the slope of this line. We have found that adjustment of the dark responses of a surprisingly small number of elements results in a relatively large increase in the signal-to-noise ratio at low light levels. For example, adjustment of all the dark responses falling outside of the one sigma limit (i.e. 18.6% of the element responses) in the gaussian distribution shown in FIGS. 1a and 1b nearly doubles the signal signal-to-noise ratio at low light levels. The adjusted signal-to-noise ratio as a function of light level is shown by line 202 in FIG. 2 having a slope $1/\sigma'_{DC}$.

Sensitivity variations produce deviations in the signal which are proportional to the sensor illumination level. Therefore both the signal and the sensitivity noise are linearly related to the illumination level, resulting in a signal-to-noise ratio which is independent of the sensor illumination level. The upper limit on signal-to-noise ratio due to sensitivity pattern noise takes the form $1/\sigma_{SV}$ where $\sigma_{SV}$ is the standard deviation of the element sensitivity response distribution expressed in percentage deviation from the average element sensitivity.

Figure 2:
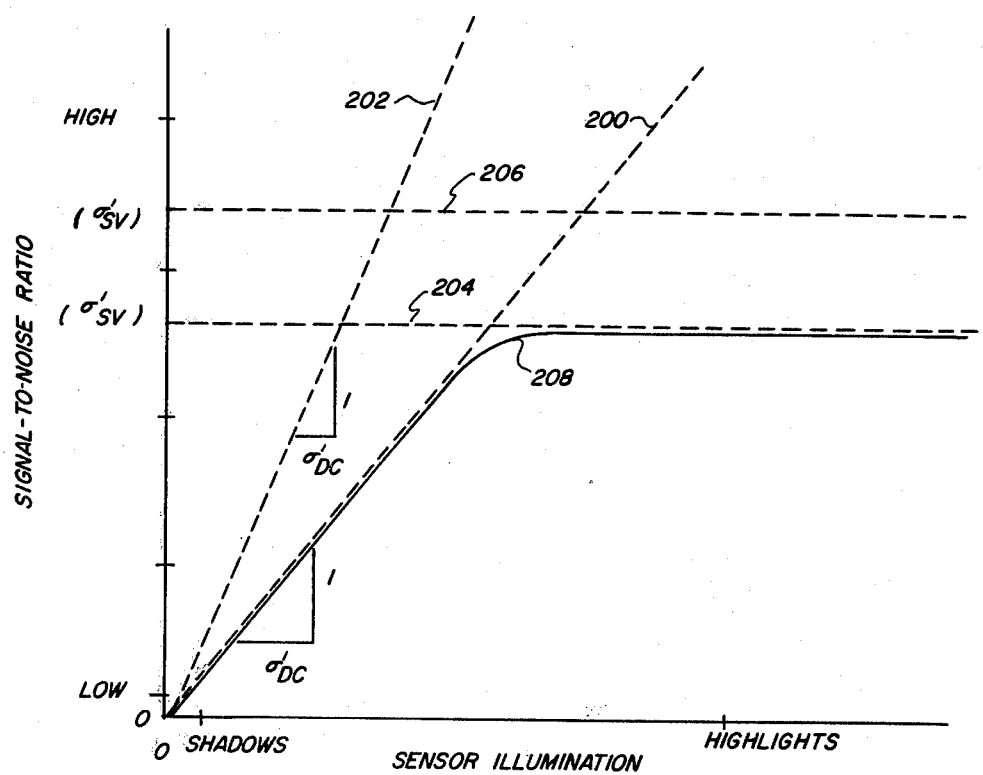
FIG. 2 is a qualitative graph showing the signal-to-noise ratio versus light level for a solid state image sensing array, and useful in describing the present invention.

The signal-to-noise ratio versus sensor illumination due to sensitivity pattern noise is represented as a horizontal line 204 in FIG. 2. The height of the line is proportional to $1/\sigma_{SV}$. The effect of reducing the spread of the sensitivity response distribution is to raise this line up on the graph as illustrated by line 206 in FIG. 2.

In the area where lines 200 and 204 intersect, both dark current pattern noise and sensitivity pattern noise contribute to the signal-to-noise ratio, and the graph makes a smooth transition between the two lines as shown by solid line 208.

By constructing a graph similar to FIG. 2, the amounts of reduction in dark current and sensitivity pattern noise needed to make a particular sensor meet a given set of performance specifications are clearly shown Our measurements of the element response distributions of several commercially available charge coupled device (CCD) solid state image sensing arrays, and of one experimental CCD array fabricated in the Research Laboratories of the Eastman Kodak Company, indicate that for the applications in which we were interested the dark current contribution to pattern noise is the dominant factor in limiting the signal-to-noise ratio of the sensing arrays. While the dark current pattern is different for each such sensing array, the dark response distribution does not change significantly with time for a given array. In accordance with the preferred embodiment of the present invention, only dark current pattern noise in the signal produced by an array of light sensitive elements is reduced. The sensor array is operated in the dark and the signals produced thereby are analyzed statistically to determine a subset of response adjustments that reduce the standard deviation of the dark response distribution to the required value. When the sensing array is operated to sense an imagewise light pattern, the response adjustments are applied to the signals produced by the subset of elements in the form of additions to and subtractions from the signals.

The complexity of the noise reduction apparatus associated with each sensor array is reduced by separating the step of determining the subset of elements to receive response adjustments from the step of implementing the adjustments. With such an arrangement, the dark response of a sensor is measured at the factory and the subset of response adjustments computed there. The locations of the elements and amounts of adjustment are stored in a memory associated with the noise reduction apparatus.

Figure 3:
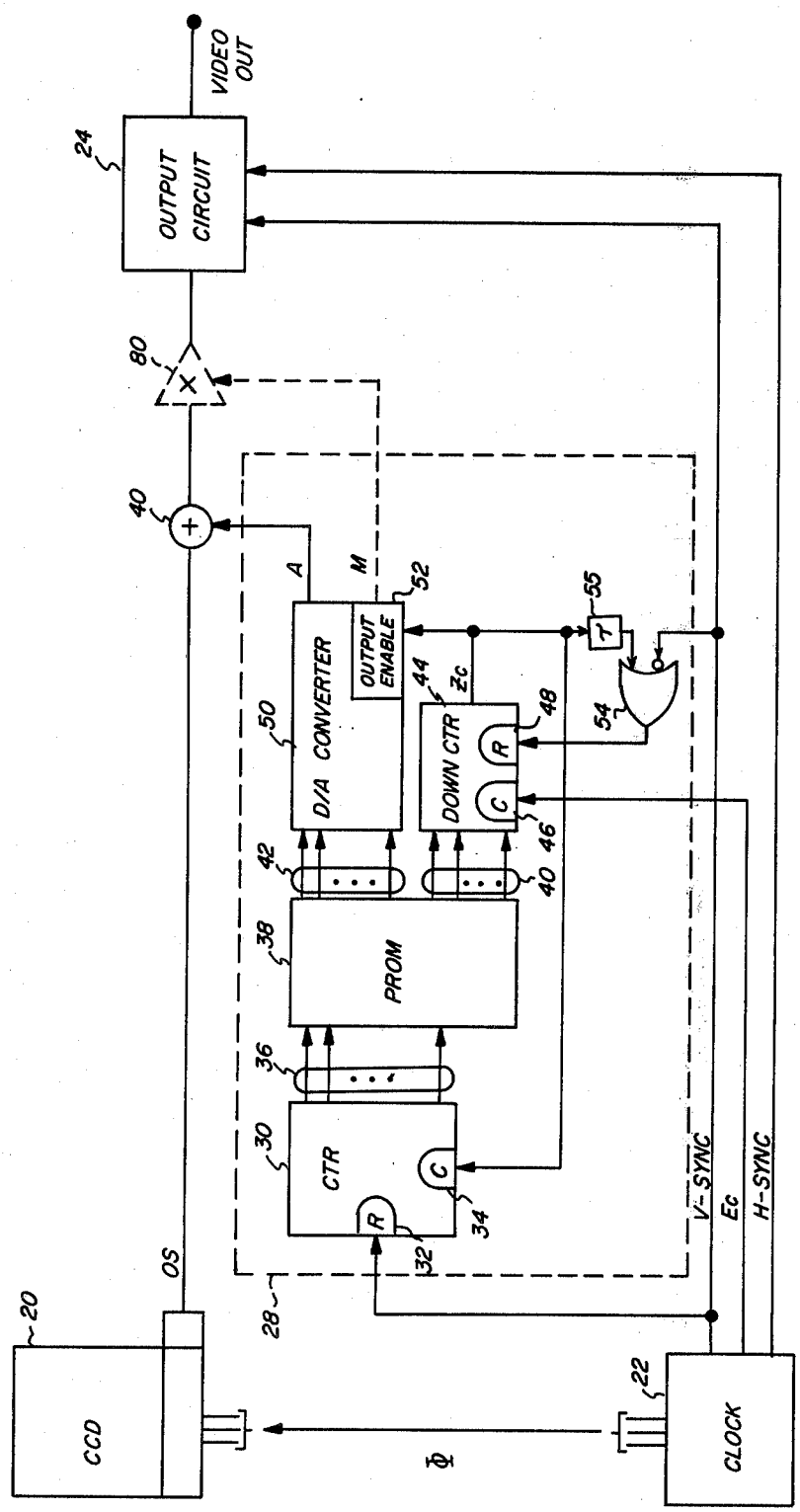
FIG. 3 is a schematic diagram of noise reduction apparatus according to a preferred embodiment of the present invention.

FIG. 3 is a schematic diagram showing noise reduction apparatus, in combination with a solid state image sensing array, according to the preferred embodiment of the present invention. The image sensing array 20 comprises, for example, a three phase CCD, frame-transfer type, image sensor. In the example shown in FIG. 3, the CCD image sensing array is operated as a video camera (alternatively, the image sensing array could be operated as a still camera to record a sequence of distinct still images). The CCD sensor is driven by three phase clock signals Φ, produced by a clock circuit 22 in a known manner, to generate an output signal OS, comprising a serial train of pulses. Each pulse in OS represents the photosignal plus pattern noise generated by an element of the image sensing array. The output signal OS of the array is fed to an output circuit 24 which also receives horizontal and vertical sync pulses from clock 22 to produce a standard format video signal in a known manner. The noise reducing circuit 28 according to a preferred embodiment of the present invention includes a first counter 30 having a reset input 32 and a clock input 34. The vertical sync signal from clock generator 22 is supplied to the reset input 32 of counter 30. Counter 30 supplies a count in the form of a digital word, on lines 36 to a programmable read-only memory (PROM) 38. The counts supplied on lines 36 to the PROM address memory locations within the PROM containing signals representing the locations of the elements in the subset and amounts of adjustment to element responses. The locations and amounts of element response adjustment are supplied in the form of code words on lines 40 and 42, respectively. The element location code word on lines 40 is supplied to a down counter 44 having a clock input 46 and a reset input 48. The response adjustment code word on lines 42 is supplied to a digital-to-analog (D/A) converter 50 having an output enable terminal 52. D/A converter 50 decodes the response adjustment code words supplied via lines 42 and upon receipt of a signal on output enable terminal 52 produces an analog adjustment signal A that is supplied to a summing node 40. Summing node 40 also receives the output signal OS from CCD image sensor 20 and the resulting sum is supplied to output circuit 24.

The element location code word supplied on lines 40 to down counter 44 is in the form of a relative address representing the number of elements from the previously adjusted element location to the next adjusted element location. Down counter 44 counts element clock pulses $E_c$ (comprising, for example, one phase of the multiphase clock signal $\Phi$) supplied to clock input 46, counting backwards from the relative address code word to zero. When the down counter reaches zero, it produces an output pulse $Z_c$ which is supplied to: (1) the output enable terminal 52 of D/A converter 50; (2) the clock input 34 of counter 30; and (3) one input terminal of an OR gate 54 (via a time delay 55 to eliminate any race problems). The other input terminal of OR gate 54 is an inverting input (indicated by the small circle in FIG. 3) and receives the vertical sync pulse from clock 22. The output of the OR gate 54 is supplied to the reset input 48 of down counter 44.

At the beginning of a field or frame the vertical sync pulse from clock 22 supplied to reset input 32 of counter 30 resets counter 30 to zero. The vertical sync pulse supplied via OR gate 54 to reset input 48 of down counter 44 allows initial loading of the down counter. PROM 38 receives instructions to address location zero via lines 36. Location zero of PROM 38 contains coded words representing the number of sensor elements to the first element location and the amount of adjustment required at that location. The element location code word supplied via lines 40 to down counter 44 is loaded into the down counter. The response adjustment code word supplied via lines 42 to D/A converter 50 is decoded, but is not sent to summing node 40 until a pulse is received on output enable terminal 52. Down counter 44 counts the element clock pulses $E_c$ down toward zero from the number of elements to the location of the first element to receive response adjustment. When the down counter 44 reaches zero, corresponding to the position of the first element to receive response adjustment, a zero count pulse $Z_c$ is produced by the down counter 44. The zero count pulse supplied to output enable terminal 52 of D/A converter 50 enables the analog response adjustment signal A to be sent to summing node 40. The zero count pulse is also supplied to clock input 34 of counter 30, thereby advancing the counter by one and addressing the next element location and response adjustment code words in PROM 38. The zero count pulse supplied via OR gate 54 to reset input 48 of down counter 44 enables the down counter to receive the next element location code word from PROM 38. This sequence repeats, with the counter 30 incrementing each time an element response is adjusted. At the end of the field or frame, the vertical sync pulse resets the counters and the whose process starts over again.

The noise reduction apparatus described above employs a relative addressing scheme wherein the position of an element requiring response adjustment is identified by its displacement relative to the previous element to receive response adjustment. If each element in the array to receive response adjustment is identified in the memory by a relative address word that is long enough to specify the distance from the first element location to the last element location in the array, the element location message stored in the memory of the noise reduction apparatus will possess a large amount of unused capacity and consequently will be wasteful of memory space. There are several well known statistical coding techniques for reducing the number of bits required for coding a message. A review of some of these techniques, as applied to image coding, can be found in "Digital Image Processing" by W. K. Pratt; John Wiley and Sons, New York, 1978, p. 626–635. We have developed a technique similar to one of the general techniques reviewed by Pratt (supra) called "Run Coding", and have used it to reduce the number of bits required to specify the element locations in the noise reduction apparatus.

"Run Coding" is a generic term covering several systems of coding. Picture elements are inspected one by one and when a significant change in the value of a picture element, from the value of the previous element, is noted, a run is said to exist. The common feature of run coding systems is that the locations of the runs are encoded and stored in memory. The number of picture elements between two successive runs is called the run length, and in the specific system known as "run length coding", it is the run lengths that are coded and stored in memory. Since the average run length is much less than the length of the whole array, on the average, the run length coding system requires shorter groups of bits to specify the run length. To take full advantage of this fact; however, a variable length code word must be employed. Unfortunately, variable length codes present difficulties in encoding and increase the complexity of decoding hardware. A compromise is possible by limiting the size of the code word to a fixed number of bits capable of describing a fixed maximum run length. If no actual run occurs within the maximum run length describable by the fixed length word, one or more "pseudo runs" are inserted between the last actual run and the next actual run. The pseudo run usually specifies a change of zero magnitude. As implemented in the present invention, the "pseudo run" may specify an actual response adjustment, but to the response of an element lying within the band $\overline{X} \pm x$. As the number of bits in the fixed length code word, and hence the maximum describable run length, is reduced, the number of "pseudo runs" increases. There exists a tradeoff between shorter word lengths and the resulting additional number of pseudo runs. With a judicious choice of word length based on the statistical distribution of run locations, the memory size needed to store the run locations may be considerably reduced.

Figure 4:
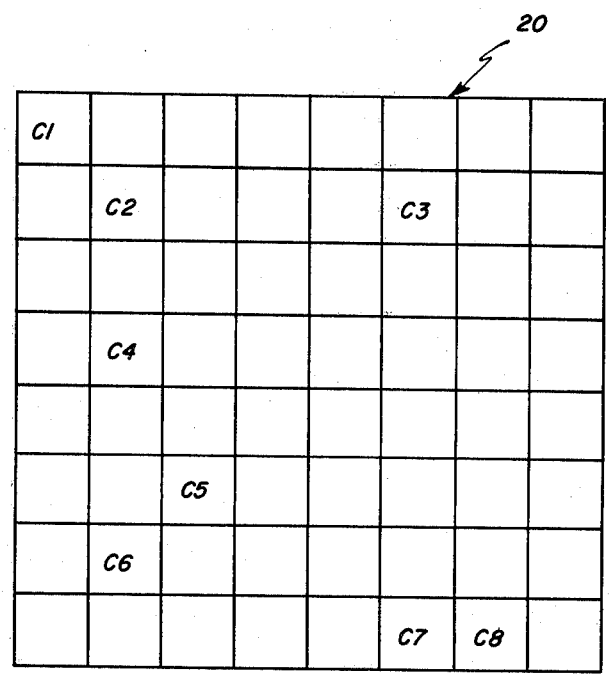
FIG. 4 is a schematic diagram of a two-dimensional array of elements, illustrating the locations of elements requiring response adjustments.

One such approach for finding an optimum word length is described by Pratt (supra, p. 632-635). According to the present invention, run length coding is employed to specify the locations of elements in the sensor array that are to receive response adjustments. Using calculations similar to those employed by Pratt (supra) we have found that the optimum word length for run length encoding for use with noise reduction techniques according to the present invention is approximately equal to the number of bits required to describe the average run length, plus one more bit. For example, FIG. 4 shows an 8×8 array 20 of elements having eight elements designated C1 through C8 whose responses are to be adjusted. The fraction of response adjusted elements is $2^{-3}$, the average run length therefore is $2^3$ elements, which can be represented by a three bit code word. According to the rule stated above, on the average, the minimum memory size for storing the response adjustment locations will be obtained when the word length used to specify a run is four bits long, i.e. three bits plus one more. Table I shows the total number of bits required for coding the locations of the elements C1 through C8 by absolute addressing, relative addressing, and "run length coding" according to the present invention. As can be seen from Table I, the total number of bits required to code the element locations in the absolute addressing scheme and the relative addressing scheme are equal, however, there is a substantial reduction in the total number of bits required to code the element locations using the run length coding scheme.

the dark current signal data stored in the computer memory. The mean dark current $\overline{X}$ is approximately $200 \times 10^3$ charge carriers per element and the standard deviation $\sigma_{DC}$ of the dark current distribution is $30.9 \times 10^3$ charge carriers.

TABLE I

| RESPONSE ADJUSTED ELEMENT | ABSOLUTE ADDRESSING | | RELATIVE ADDRESSING | | RUN LENGTH CODE | |
|---|---|---|---|---|---|---|
| | NO. OF ELEMENTS FROM START OF ARRAY | BIT ASSIGNMENT | NO. OF ELEMENTS FROM LAST ELEMENT TO RECEIVE RESPONSE ADJUSTMENT | BIT ASSIGNMENT | NO. OF ELEMENTS IN RUN | BITS ASSIGNMENT |
| $C_1$ | 1 | 000000 | 1 | 000000 | 1 | 0000 |
| $C_2$ | 10 | 001001 | 9 | 001000 | 9 | 1000 |
| $C_3$ | 14 | 001101 | 4 | 000011 | 4 | 0011 |
| $C_4$ | 26 | 011001 | 12 | 001011 | 12 | 1011 |
| | | | | | 16 | 1111 (PSEUDO RUN) |
| $C_5$ | 43 | 101010 | 17 | 010000 | 1 | 0000 |
| $C_6$ | 50 | 110001 | 7 | 000110 | 7 | 0110 |
| $C_7$ | 62 | 111101 | 12 | 001011 | 12 | 1011 |
| $C_8$ | 63 | 111110 | 13 | 001100 | 13 | 1100 |
| TOTAL BITS | | 48 | | 48 | | 36 |

EXAMPLES

Figure 5A:
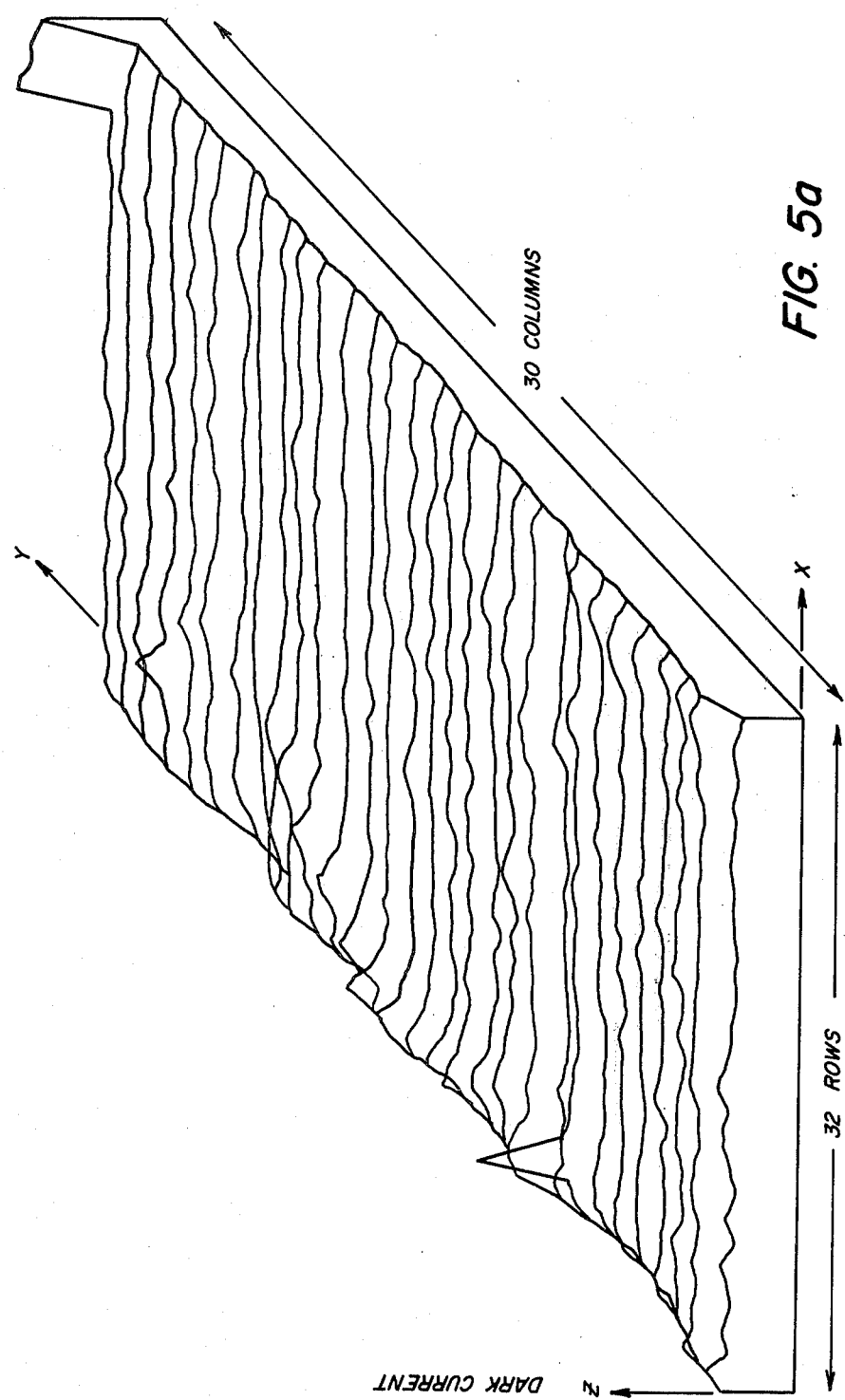
FIGS. 5a and b are an unmodified dark signal signature, and dark signal histogram, respectively, of an experimental two-dimensional solid stage image sensing array.
Figure 5B:
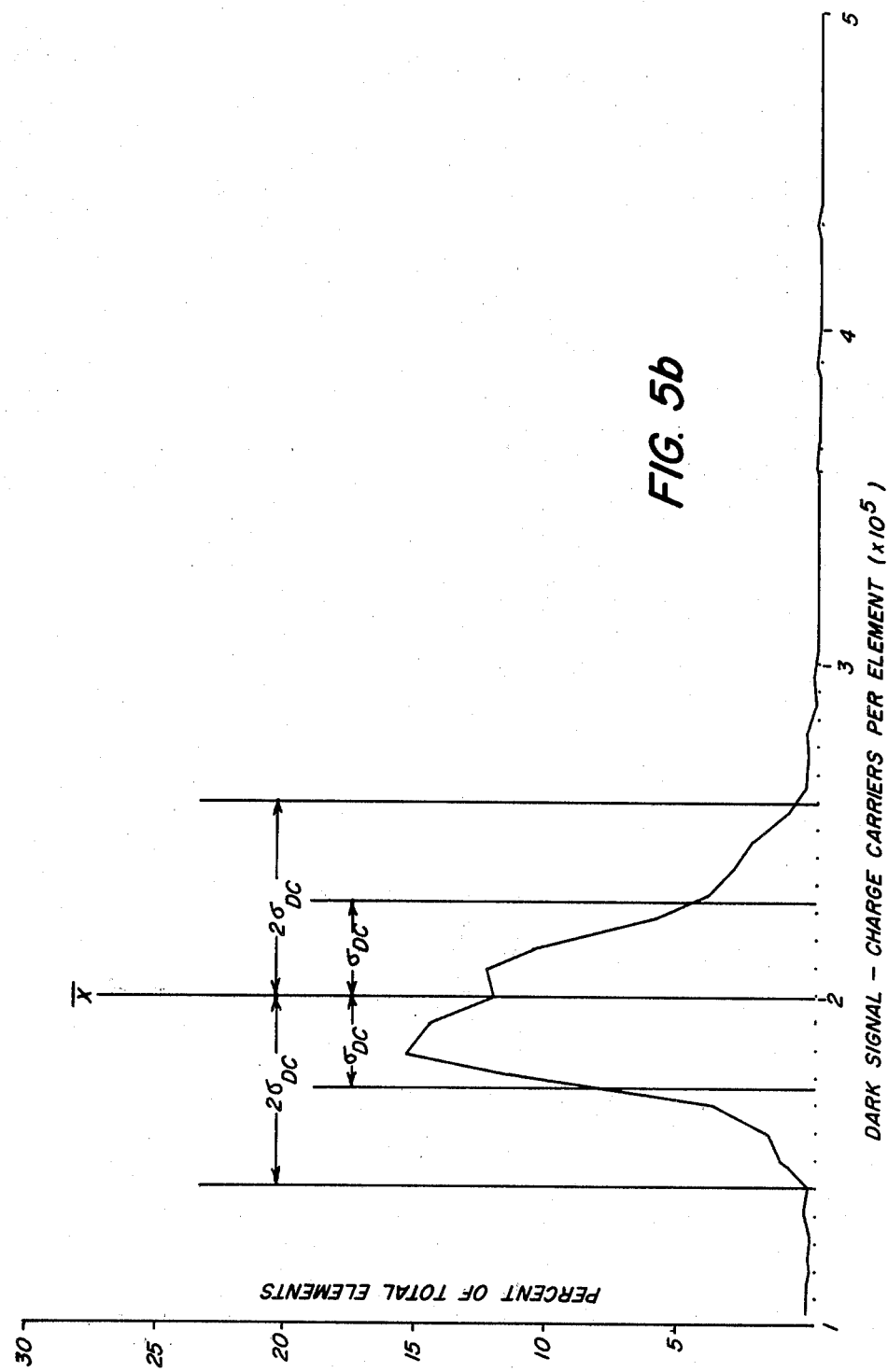
Figure 6A:
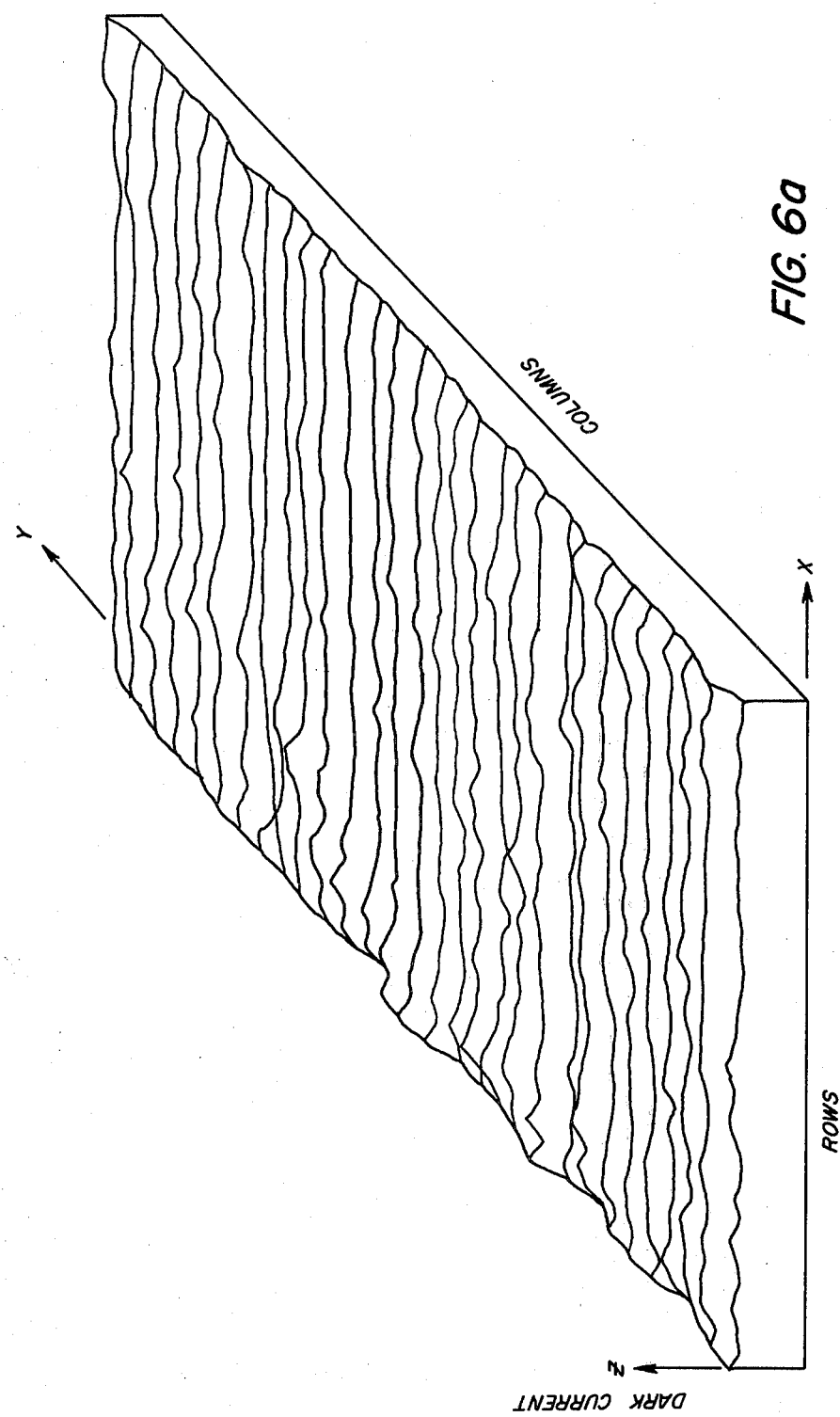
FIGS. 6a and b are the dark signal signature and histogram, respectively, of the array of FIGS. 5a and b after adjusting the responses of 2.8% of the elements according to the present invention.

The method of noise reduction according to the preferred practice of the present invention was employed to reduce the dark current pattern noise in the signal produced by a 32 row by 30 column frame transfer charge coupled device image sensor manufactured in the Research Laboratories of the Eastman Kodak Company. The dark current pattern of this device was found to be typical of commercial quality CCD area image sensors in general. The image sensor was operated in the dark and the output of each sensing element was stored in a computer memory for statistical analysis. FIG. 5a is a three-dimensional plot produced by the computer from the dark signal data stored in the memory. The magnitude of the dark current is represented along the z axis and the locations of the elements are defined by the x and y axes. This type of plot will hereinafter be referred to as a dark current signature. FIG. 5b is a histogram plot produced by the computer from In the first example of pattern noise reduction according to the present invention, the responses of all the sensing elements lying outside of the $2\sigma$ limit were adjusted toward the mean dark current signal X by adding or subtracting the deviation from the mean. 2.8% of the element responses were adjusted in this manner. FIG. 6a shows the adjusted dark current signature and FIG. 6b shows the dark current histogram when 2.8% of the element responses were adjusted according to the present invention. The adjusted standard deviation $\sigma'_{DC}$ of this distribution is $22.4 \times 10^3$ carriers.

Figure 7A:
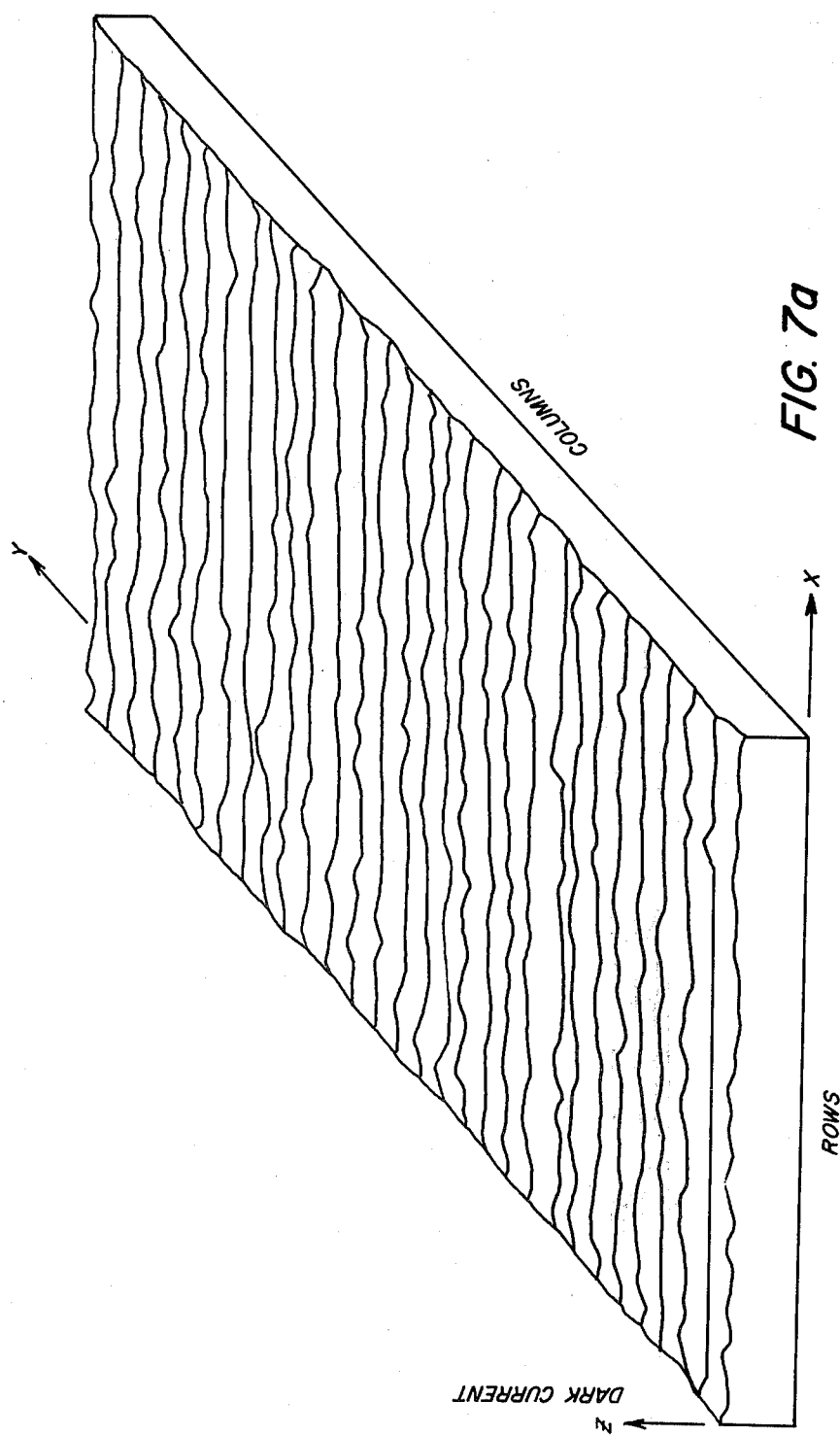
FIGS. 7a and b are the dark signal signature and histogram, respectively, of the array of FIGS. 5a and b after adjusting the responses of 18.6% of the elements according to the present invention.
Figure 7B:
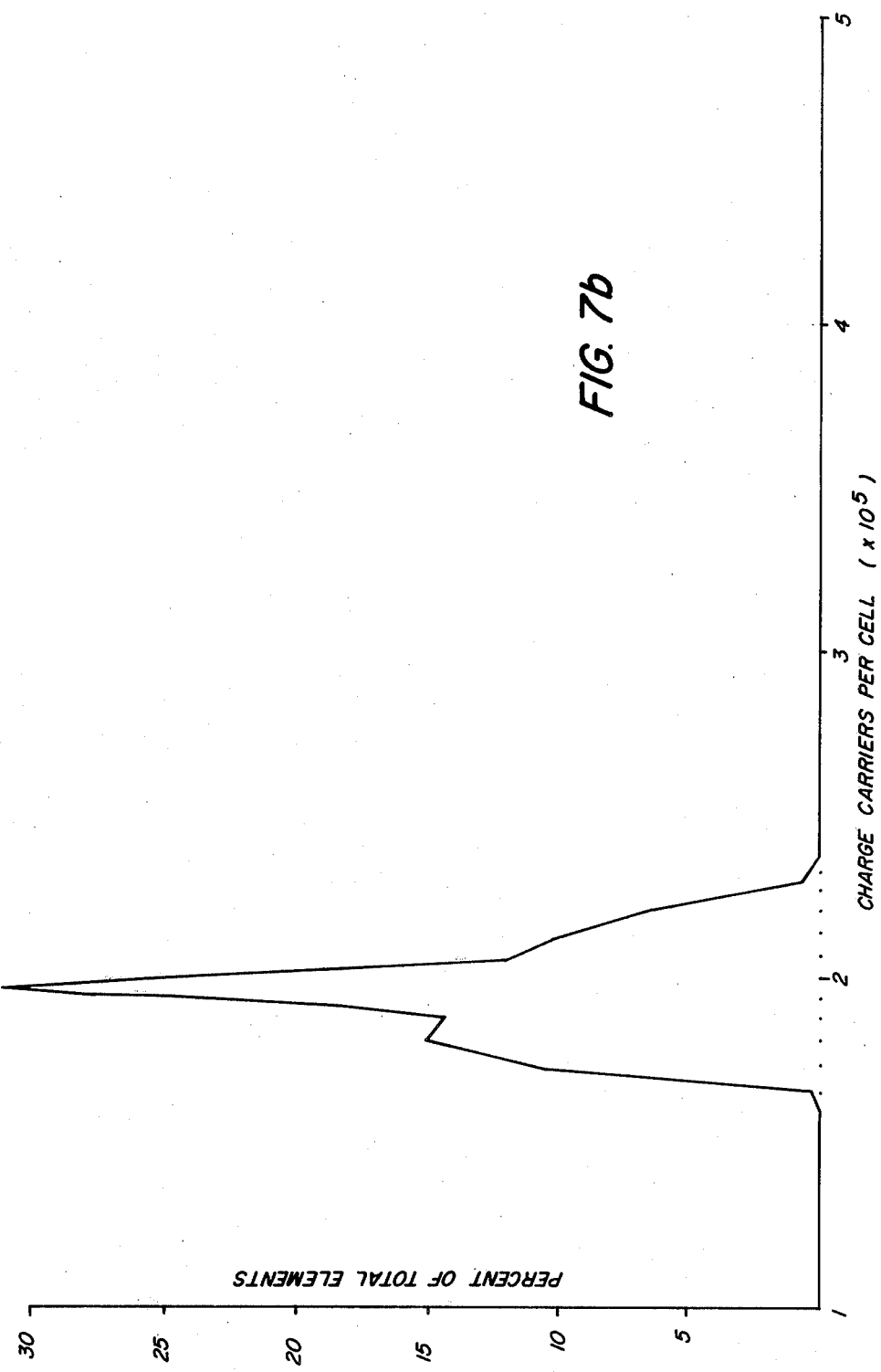

In the second example, all element responses beyond one standard deviation in the response distribution were adjusted toward the mean response $\overline{X}$. In this example 18.6% of the element responses were adjusted. FIG. 7a shows the adjusted dark current signature and FIG. 7b shows the adjusted dark current histogram when 18.6% of the element responses were adjusted according to the present invention. The standard deviation $\sigma'_{DC}$ in this example has been reduced to $14.4 \times 10^3$ charge carriers. The reduction in the standard deviation of the dark signal distribution when only a relatively small percentage of element responses were adjusted was significantly greater for the actual device when for the theoretical model, assuming a gaussian distribution. This was due to the fact that the actual dark signal distribution included more responses in the upper and lower extremes of the distribution than did the ideal gaussian distribution. The experimental results indicate, for example, that to reduce dark current pattern noise by a factor of 2, only about 15% of the element responses have to be adjusted.

In some types of solid state sensor arrays and in some sensor applications, both dark current pattern noise and sensitivity pattern noise are significant factors contributing to the signal-to-noise ratio. When such is the case, the method of pattern noise reduction according to the present invention is employed to reduce both the dark current pattern noise and the sensitivity pattern noise. The dark current pattern noise is reduced by adjusting the responses of a first subset of elements, as outlines above, and the sensitivity pattern noise is reduced by applying percentagewise adjustments to the responses of a second subset of elements. According to this technique, the output of the sensor is measured both in the dark and in the light under non-imagewise illumination. The dark responses of the sensor elements are subtracted from the light responses to yield a pure light response distribution that is affected by sensitivity variations, and not dark current. The second subset of elements is chosen from the upper and lower extremes of this pure light response distribution, and percentagewise adjustments are chosen to move the responses in the second subset toward an average light response. When the sensor is operated normally under imagewise illumination, the dark current adjustments are made to the responses of the first subset of elements, and the sensitivity adjustments are made to the responses of the second subset of elements. Some elements may be members of both subsets.

Adjustments according to this embodiment of the invention are implemented with apparatus similar to the apparatus employed to implement the dark current pattern noise reduction with the addition of means for storing, decoding and implementing a percentagewise adjustment comprising a multiplicative constant (near one) for each sensitivity response adjustment to be implemented. The apparatus shown in FIG. 3 is modified to provide such means by the addition of a multiplier circuit 80, as shown in dotted lines, in the path between the output of summing node 40 and the output circuit 24. The multiplier circuit 80 receives the multiplicand from summing node 40 and a multiplier M from D/A converter 50. D/A converter 50 is suitably constructed according to well-known techniques to decode and produce the multiplier signal M. PROM 38 now contains the addresses of both subsets of elements.

The invention has been described in detail with reference to particular embodiments thereof, however, it is understood that variations and modifications may be made within the spirit and scope of the invention. For example, the electronic circuitry described for implementing the pattern noise reduction according to the present invention may comprise a suitably programmed digital computer, such as a microprocessor, appropriately interfaced with the sensor array and the output circuit such as by analog-to-digital and digital-to-analog converters. Also, other coding techniques such as Huffman coding for further reducing the required memory size for storing element locations by optimizing the number of element locations per stored bit may be employed. Such codinhg techniques may also be used for reducing the required memory size for storing the amounts of response adjustment to be implemented.

Although the invention has been described with reference to reducing pattern noise in arrays of electrooptical imaging elements employed to sense images, the methods and apparatus of the invention are also applicable to the reduction of pattern noise in arrays of electrooptic elements used to form images, such as arrays of light emitting diodes responsive to input signals to imagewise expose a photosensitive material. In this case, the response adjustments according to the present invention would be applied to the input signals used to drive the array, the output signal from the array being the lights produced by the LED's.

We claim:

1. A method of reducing pattern noise in output signals from an array of solid state image sensing elements, comprising the steps of:
   (a) operating the array under controlled illumination conditions to produce a first set of output signals representing the responses of the respective sensing elements of substantially the entire array to the controlled illumination conditions, said first set of responses forming a statistical distribution having an average and upper and lower extremes;
   (b) forming, from said first set of output signals, response adjustment signals representing (1) the locations in the array of a subset of sensing elements having responses in the upper and lower extremes of the element response distribution, and (2) adjustments to the output signals produced by said subset of sensing elements to move the individual responses of said subset of elements toward said average element response;
   (c) operating the array under image sensing conditions to produce a second set of output signals; and
   (d) adjusting, in accordance with said individual response adjustment signals, the separate output signals in said second set that were produced by said subset of sensing elements, to reduce the pattern noise in said second set of output signals.

2. The method claimed in claim 1, wherein: said array is operated in the dark in step (a); and wherein said adjustments formed in step (b) are additions or subtractions, whereby dark current pattern noise is reduced.

3. The method claimed in claim 1, wherein: said controlled illumination conditions include both in the dark, and in light without image content and wherein said response adjustments includes a first subset of response adjustments comprising additions or subtractions and a second subset of response adjustments comprising percentagewise adjustments, whereby both dark current pattern noise and sensitivity pattern noise are reduced.

4. The method claimed in claim 1 wherein: said response adjustment signals are formed and stored in a memory.

5. Solid state image sensing apparatus, comprising:
   (a) an array of solid state image sensing elements responsive to light for producing an output signal, said output signal including pattern noise caused by variations in the responses of the respective elements, said response variations forming a statistical distribution having a spread between upper and lower extremes and an average; and
   (b) means responsive to said output signal for producing a pattern noise reduced output signal, including:
      (1) memory means for storing pattern noise reduction information comprising coded signals representing the locations of and individual response adjustments to the output signals from a subset of elements in the array, said subset of elements being composed of elements from the extremes of the element response distribution and said response adjustments being toward the average element response for reducing the spread of the response distribution;
      (2) means for addressing said memory means to recall said pattern noise reduction information in conjunction with the corresponding output signals produced by said array; and
      (3) means for decoding said coded signals comprising said pattern noise reduction information, and for implementing said individual response adjustments to the separate output signals produced by said subset of elements.

6. The apparatus claimed in claim 5, wherein: said pattern noise is dark current; and wherein said response adjustments are additions or subtractions to the output signals produced by said subset of elements, whereby dark current pattern noise is reduced.

7. The apparatus claimed in claim 5, wherein: said pattern noise is composed of dark current pattern noise and sensitivity pattern noise; and wherein said response adjustments are additions and subtractions or percentagewise adjustments to the output signals produced by said subset of elements, whereby dark current and sensitivity variation pattern noise is reduced.

8. A method of reducing pattern noise in an array of electrooptic imaging elements, comprising the steps of:
  (a) operating the array under controlled input conditions to produce a first set of output signals derived from substantially the entire array and representing the response of the respective electrooptic imaging elements said first set of responses forming a distribution having an average and upper and lower extremes;
  (b) forming, from said first set of output signals, a set of individual response adjustment signals representing:
    (1) the locations in the array of a subset of elements having responses in the upper and lower extremes of the element response distribution, and
    (2) adjustments to the individual responses of said subset of elements toward the average element response;
  (c) operating the array under imaging conditions to produce a second set of output signals; and
  (d) adjusting, in accordance with said individual response adjustment signals, the separate output signals in said second set that were produced by said subset of imaging elements, to reduce the pattern noise in said second set of output signals.

9. In image sensing apparatus of the type having an array of solid state image sensing signal producing elements, the responses of said elements forming a statistical distribution having upper and lower extremes, and an average, the improvement for reducing pattern noise in the output signals from said array, comprising:
  means for deriving a set of individual response adjustment signals based on the responses of all the elements in the entire array, representing (1) the locations in the array of a subset of elements having responses in the upper and lower extremes of the element response distribution and (2) adjustments to the individual responses of said elements in said subset of elements to move said element responses toward the average response, and
  means for applying to the separate output signals of said subset of elements, adjustments corresponding to said individual response adjustment signals, to reduce the pattern noise in said output signals.

10. The apparatus claimed in claim 9, further comprising: memory means for storing said individual response adjustment signals after their derivation and until their application to said signals.

* * * * *